United States Patent
Onishi

(10) Patent No.: US 7,026,386 B2
(45) Date of Patent: Apr. 11, 2006

(54) FLAME-RETARDANT STYRENE RESIN COMPOSITION

(75) Inventor: Hideaki Onishi, Otsu (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 139 days.

(21) Appl. No.: 10/470,085

(22) PCT Filed: Sep. 4, 2002

(86) PCT No.: PCT/JP02/09000

§ 371 (c)(1),
(2), (4) Date: Jul. 24, 2003

(87) PCT Pub. No.: WO03/035748

PCT Pub. Date: May 1, 2003

(65) Prior Publication Data

US 2004/0092642 A1 May 13, 2004

(30) Foreign Application Priority Data

Oct. 24, 2001 (JP) .................................. 2001-325996

(51) Int. Cl.
*C08K 5/03* (2006.01)

(52) U.S. Cl. .................................................. 524/466

(58) Field of Classification Search .................. 524/466
See application file for complete search history.

(56) References Cited

U.S. PATENT DOCUMENTS 5,171,757 A * 12/1992 Stobby et al. ................ 521/85
2004/0242736 A1 * 12/2004 Onishi et al. ............... 524/104

FOREIGN PATENT DOCUMENTS

| JP | 8-092443 A | 4/1996 |
| JP | 8-291241 A | 11/1996 |
| JP | 11-012416 A | 1/1999 |
| JP | 2002-234964 A | 8/2002 |

* cited by examiner

*Primary Examiner*—Peter Szekely
(74) *Attorney, Agent, or Firm*—Millen, White, Zelano & Branigan, P.C.

(57) ABSTRACT

The present invention relates to a flame-retarded styrene-based plastic composition comprising (A) a styrene-based plastic material (B) a brominated aromatic compound having a melting point from 200° C. to 260° C. in which all bromine atoms are attached to the aromatic ring, (C) a brominated aromatic compound having a melting point above 300° C. in which all bromine atoms are attached to the aromatic ring, (D) an organic compound having at least one 2,3-dibromopropyl group, and optionally (E) antimony trioxide.

20 Claims, No Drawings

FLAME-RETARDANT STYRENE RESIN COMPOSITION

FIELD OF THE INVENTION

This invention relates to a styrene-based plastic composition which has an excellent flame retardancy and is self-extinguishable by melt-dripping. The composition comprises a plurality of flame retardants which exhibit when used in combination a synergistic effect on the flame retardancy. Since the combined flame retardants exhibit desired flame retardancy even in small amounts of addition and are highly heat stable and less detriorative to the appearance and mechanical properties of the plastics, a cost effective flame-retarded styrene-based plastic composition having an excellent moldability may be provided for use in fabricating housings and parts of household and office automation apparatus and equipments as well as other flame retarded articles of melt-dripping type.

BACKGROUND PRIOR ART

Styrene-base plastics are widely used to fabricate housings and parts of household and office automation apparatus and equipments utilizing their excellent moldability, appearance and mechanical properties. For these applications, the fabricated articles are required to be flame retarded to avoid dangerous firing and flame-retarded styrene-based plastic compositions containing a halogenated flame retardant have been used to date. In addition to the flame retardancy, the plastic compositions are required to have increased heat stability, heat resistance, melt-flowability, impact strength and other properties for such applications.

A typical example of cases where fabricated plastic products are required to be self-extinguishable by melt-dripping is to produce plastic articles meeting grade V-2 in the vertical burning test method according to UL-94 standard of Underwriters Laboratoires. JP-B-5904360 and JP-B-62034784 disclose a flame retarding technology to achieve the above requirement by incorporating hexabromocyclododecane known to be effective in small amounts of addition into plastics. Hexabromocyclododecane is, however, thermally decomposed at a relatively low temperature. Therefore, when compounding with plastics under heat it decreases the heat stability of the resulting composition and changes color thereof from bright to dark.

German Patent No. 2,150,700 discloses bis(2,3-dibromopropyl) ether of tetrabromobisphenol A as a flame retardant having improved heat stability compared to hexabromocyclododecane. This flame retardant is still not satisfactory in heat stability and may produce scorching when used for instance, in the hot runner molding technique to shorten the molding cycle time and improve the efficiency of molding operations.

JP-A-05140389 discloses use of certain heat stabilizers in combination with bis(2,3-dibromopropyl) ether of tetrabromobisphenol A to remedy the above defect. The heat stability of the above flame retardant was found to be not entirely satisfactory in practice by this approach.

Use of another flame retardant in combination with tetrabromobisphenol A bis(2,3-dibromopropyl)ether has been proposed. JP-A-04239548 and JP-A-04292646 disclose a bromine-containing organic phosphorus compound and a bromine-containing epoxy polymer, respectively as a flame retardant to be combined. These proposals are proven, however, to be not entirely effective to increase the heat stability or deteriorative to the heat resistance, impact strength and other properties of plastics because a relatively large amount must be added.

JP-A-08208939 discloses a styrene-based plastic composition having well-balanced heat resistance, impact strength and heat stability containing a polyhalogenated diphenylalkane and an organopolysiloxane. Polyhalogenated diphenylalkane itself is, however, not uniformly dispersible in the plastics and the composition are often not stable in properties among different batches and also exhibit poor flowability.

SUMMARY OF THE INVENTION

The object of the present invention is to eliminate or ameliorate various problems associated with prior art.

The present invention provides an economically effective, flame-retarded styrene-based plastic composition having well-balanced properties including heat stability, heat resistance, melt-flowability and impact strength.

The composition comprises:

(A) a styrene-based plastic material;

(B) a brominated aromatic compound having a melting point from 200° C. to 260° C. in which all bromine atoms are attached to the aromatic ring;

(C) a brominated aromatic compound having a melting point above 300° C. in which all bromine atoms are attached to the aromatic ring;

(D) an organic compound having at least one 2,3-dibromopropyl group;

and optionally (E) antimony trioxide;

the proportions of components (B), (C), (D) and (E) per 100 parts by weight of the styrene-based plastic material (A) being such that the sum of (B)+(C)+(D) is 3 to 10 parts by weight in which (D) occupies 20 to 80% by weight of the sum and (C) occupies 10 to 60% by weight of the balance, and component (E) is 0 to 3 parts by weight.

DESCRIPTION OF PREFERRED EMBODIMENTS

The term "styrene-based plastic material" as used herein refers to polystyrene, styrene-α-methylstyrene copolymer and other copolymers of styrene with minor proportions of comonomers such as butadiene, methyl methacrylate, acrylonitrile, maleic anhydride or a derivative thereof or itaconic acid.

Examples of brominated aromatic compounds having a melting point from 200° C. to 260° C. (B) include tris (tribromophenoxy) triazine (m.p. about 230° C.), a mixture thereof with dibromophenoxy-bis(tribromophenoxy) triazine and/or bis(dibromophenoxy)-tribromophenoxytriazine, bis(tribromophenoxy)ethane (m.p. about 225° C.) and brominated trimethylphenylindane (m.p. 235–255° C.) Similar compounds having a melting point lower than 200° C. may adversely affect the heat resistance of the resulting plastic composition and are not suitable.

Examples of brominated aromatic compounds having a melting point above 300° C. include brominated diphenylalkanes such as decabromodiphenylmethane, nonabromodiphenylmethane, decabromodiphenylethane, or nonabromodiphenylethane; ethylene-bis-brominated phthalimides such as ethylene-bis-tetrabromophthalimide; brominated diphenyl ethers such as decabromodiphenyl ether or nonabromodiphenyl ether; and brominated phenyl benzyl ethers such as pentabromophenyl pentabromobenzyl ether.

Organic compounds having at least one 2,3-dibromopropyl group (D) include 2,3-dibromopropyl ethers of chlorinated or brominated phenols and tris(2,3-dibromopropyl)isocyanurate. Specific examples thereof include the following:

1-(2,3-dibromopropoxy)-2,4,6-tribromobenzene;
1-(2,3-dibromopropoxy)-2,4-dibromobenzene;
4,4'-bis(2,3-dibromopropoxy)-3,3',5,5'-tetrabromobiphenyl;
bis[4-(2,3-dibromopropoxy)-3,5-dibromophenyl]methane;
1,1-bis[4-(2,3-dibromopropoxy)-3,5-dibromophenyl]ethane;
2,2-bis[4-(2,3-dibromopropoxy)-3,5-dibromophenyl]propane;
bis[4-(2,3-dibromopropoxy)-3,5-dichlorophenyl]methane;
1,1-bis[4-(2,3-dibromopropoxy)-3,5-dichlorophenyl]ethane;
2,2-bis[4-(2,3-dibromopropoxy)-3,5-dichlorophenyl]propane;
bis[4-(2,3-dibromopropoxy)-3,5-dibromophenyl]sulfide;
bis[4-(2,3-dibromopropyl)-3,5-dibromophenyl]sulfoxide;
bis[4-(2,3-dibromopropyl)-3,5-dibromophenyl]sulfone; and
tris(2,3-dibromopropyl)isocyanurate.

Antimony trioxide (E) which is in wide use as a flame retardancy enhancer. Particles having an average diameter of 0.4 to 1.2 μm are preferred for ease of dispersion in the plastic material.

The proportions of components (B), (C) and (D) in the flame retarded plastic compositions are such that the sum of (B)+(C)+(D) is 3 to 10 parts by weight per 100 parts by weight of the styrene-based plastic material (A). The desired flame retardancy level will not be obtained with a proportion less than the above range while excessive proportions are not only uneconomical but also adversely affect the strength properties and impact strength in particular of the resulting composition.

The proportion of antimony trioxide (E) is, when used, up to 3 parts by weight per 100 parts of styrene-based plastic material (A). Excessive proportions thereof do not further enhance the flame retardancy and may adversely affect the thermal stability, impact strength or melt-flowability.

It is important for the present invention that the weight raio D/(B+C+D) lies between 0.2 to 0.8. When departing from the above range, the balance between the flame retardancy and other properties will be lost and these properties will not be significantly different compared to cases where component (D) alone is added or component (B) and (C) are added in combination. It is also important that component (C) occupies 10 to 60% of the combined weight of components (B) and (C). Therefore, component (B) occupies the balance. When component (C) departs from the above range, the balance among impact the strength, flowability and heat resistance will be lost. Particularly, satisfactory heat resistance will not attained at a proportion of component (C) lower than the above range.

The temperature at which all components of the flame retarded plastic composition of the present invention are blended together preferably lies between 180° C. and 260° C., more preferably at about the melting point of component (B). This is because component (B) is homogeneously dispersible in the molten state in the plastic material (A) and the molten component (B) assists homogenous dispersion of component (C). Component (D) normally has a melting point below 150° C. and is dispersible at the above blending temperature. However, a temperature higher than 260° C. should be avoided since component (D) may be thermally decomposed at such temperatures to darken the plastic material.

The flame retarded plastic composition of the present invention may be processed into fabricated articles at the conventional fabricating temperature for styrene-based plastic materials. Once blended homogeneously, no concern is needed about the melting point of component (B).

The flame retarded styrene-based plastic composition of the present invention may comprise a variety of other conventional additives provided that the beneficial properties of the composition are not compromised. Examples thereof include melt-dripping enhancers, heat stabilizers, antioxidants, UV absorbers, UV stabilizers, fillers, pigments, lubricants, mold release agents and antistatic agents.

EXAMPLES

The following examples are offered to specifically illustrate the flame retarded plastic composition of the present invention without limiting the invention thereto.

Examples 1–8 and Comparative Examples 1–10

Formulations of the compositions of Examples and Comparative Examples are shown in Tables 1–3.

Component (B), component (C), component (D), antimony trioxide and antioxidant were initially mixed together in a vertical mixer for 3 minutes. Thereafter styrene-based plastic material (A) was added to the same mixer to obtain a dry blend. The blend was fed to a twin screw extruder provided with a barrel having an inner diameter of 20 mm and extruded through a die having an orifice diameter of 3 mm at a barrel temperature of 230° C. The extruded strand was cooled and solidified by passing through a water bath and cut into pellets. Test pieces were produced by injection molding the pellets using an injection molding machine at a mold temperature of 200° C. and tested for flame retardancy, HDT, ball impact strength, Izod impact strength and thermal stability according to the test methods described below. Melt flow rate (MFR) was determined using the pellets before injection molding. The results obtained are shown in Tables 1–2.

The materials used in the formulations shown in Tables 1–2 and the test methods are as follows.

Materials

1. Styrene-based Plastic Material (A)

A#1: HI-PS, available from Toyo Styrene Co., Ltd. under the name of TOYO STYROL H650.

A#2: HI-PS, available from Toyo Styren Co., Ltd. under the name of TOYO ssssstyrol H400.

2. Component (B)

B#1: 2,4,6-tris(2,4,6-tribromophenoxy)-1,3,5-triazine, m.p. 231° C., available from Dai-Ichi Kogyo Seiyaku Co., Ltd. under the name of PYROGUARD SR-245.

B#2: Brominated 1,1,3-trimethyl-3-phenylindane, m.p. 234–253° C., available from DSBG under the name of FR-1808.

3. Component (C)

C#1: decabromodiphenylethane, m.p. >300° C., available from Albemarle under the name of SAYTEX 8010.

C#2: ethylene-bis-terabromophthalimide, m.p. >300° C., available from Albemarle under the name of SAYTEX BT-93.

4. Component (D)

D#1: 2,2-bis[4-(2,3-dibromopropoxy)-3,5-dibromophenyl]propane, available from Teijin Kasei Co., Ltd. under the name of FIRE GUARD FG-3100.

D#2: Bis[4-(2,3-dibromopropoxy)-3,5-dibromophenyl] sulfone, available from Marubishi Yuka Co., Ltd. under the name of NONNEN PR-2.

D#3: Tris(2,3-dibromopropyl)isocyanurate, available from Nippon Kasei Co., Ltd. under the name of TAIC-6B.

5. Reference Compound

Tribromophenol modified brominated epoxy oligomer, m.p. <200° C., available from Tohto Kasei Co., Ltd. under the name of TB-60.

6. Antimony Trioxide $Sb_2O_3$ available from Dai-Ichi Kogyo Seiyaku Co., Ltd. under the name of PYROGUARD AN-800(T).

7. Antioxidant

IRGANOX 1010, available from Ciba Specialty Chemicals, Ltd.

Test Methods

1. Flame Retardancy

The vertial burning method according to UL-94 standard was followed. The thickness of the test piece was 3.2 mm.

2. MFR

A melt flow index tester, Model 120-FWP available from Yasuda Seiki Seisakusho Co. was used. Test conditions are as follows.

Temperature 200° C., load 5 kgf, displacement distance 4 mm.

3. Thermal Deformation Temperature

JIS K-6871 was followed using a test piece having a width of 3.2 mm and a height of 12.7 mm. The temperature at which the deformation amount of the test piece reached 0.26 mm at a load of 8.4 kg was determined.

4. Izod Impact Strength

JIS K-6871 was followed at a notch length of 3.2 mm.

5. DuPont Type Ball Impact Tester Was Used.

A ¼ inch radius steel ball was placed on a test piece having a thickness of 3.2 mm and a 500 g weight was dropped on the ball. The maximum height of drop distance at which the back of test piece remained uncracked was determined.

6. Thermal Stability

The test compositions was allowed to stay in molten state at 230° C. for 30 minutes in the injection molding machine and then injection molded. A control speciment was produced by repeating the above process without subjecting the composition to preheating in the machine for 30 minutes. The degree of coloring was evaluated as color difference between the test specimen and the control specimen according to the follow schedule.

ΔE<3, almost no coloring

ΔE>3, noticable coloring

TABLE 1

| Material (parts by weight) | Example | | | | | |
|---|---|---|---|---|---|---|
| | 1 | 2 | 3 | 4 | 5 | 6 |
| A#1: HI-PS | 100.0 | 100.0 | 100.0 | 100.0 | 100.0 | 100.0 |
| B#1 | 1.0 | 5.0 | 2.0 | 3.0 | 4.5 | — |
| B#2 | — | — | — | — | — | 2.0 |
| C#1 | 1.0 | 1.0 | — | — | 1.5 | 1.0 |
| C#2 | — | — | 1.5 | 1.5 | — | — |
| D#1 | 5.0 | 2.0 | 3.5 | — | — | 4.0 |
| D#2 | — | — | — | 3.0 | — | — |
| D#3 | — | — | — | — | 2.5 | — |
| B + C + D | 7.0 | 8.0 | 7.0 | 7.5 | 8.5 | 7.0 |
| D/(B + C + D) | 0.50 | 0.17 | 0.43 | 0.33 | 0.25 | 0.33 |
| $Sb_2O_3$ | 2.0 | 2.5 | 2.5 | 2.5 | 3.0 | 2.0 |
| Antioxidant | 0.2 | 0.2 | 0.2 | 0.2 | 0.2 | 0.2 |
| Test item | | | | | | |
| UL-94, V-2 | Pass | Pass | Pass | Pass | Pass | Pass |
| Dripping | Yes | Yes | Yes | Yes | Yes | Yes |
| MFR, g/10 min. | 5.5 | 5.4 | 5.5 | 5.4 | 5.3 | 5.8 |
| HDT, ° C. | 80 | 81 | 81 | 81 | 81 | 80 |
| Izod impact, J/m | 69 | 68 | 66 | 65 | 64 | 68 |
| Ball impact, mm | 850 | 800 | 750 | 750 | 700 | 850 |
| Thermal stability, ΔE | <3 | <3 | <3 | <3 | <3 | <3 |

TABLE 2

| Material (parts by weight) | Comparative Examples | | | | | | | |
|---|---|---|---|---|---|---|---|---|
| | 1 | 2 | 3 | 4 | 5 | 6 | 7 | 8 |
| A#1: HI-PS | 100.0 | 100.0 | 100.0 | 100.0 | 100.0 | 100.0 | 100.0 | 100.0 |
| B#1 | 8.0 | — | — | 11.0 | — | — | 5.5 | — |
| B#2 | — | 10.0 | — | — | — | — | — | — |
| C#1 | — | — | 9.0 | — | — | 3.0 | — | — |
| C#2 | — | — | — | — | — | — | 5.5 | — |
| D#1 | — | — | — | — | 6.0 | 5.0 | — | 4.0 |
| Ref. compd. | — | — | — | — | — | — | — | 6.0 |
| Total flame retardants | 8.0 | 10.0 | 9.0 | 11.0 | 6.0 | 8.0 | 11.0 | 10.0 |
| D/(B + C + D) | — | — | — | — | 1.00 | 0.63 | — | 1.00 |
| C/(B + C) | — | — | 1.00 | — | — | 1.00 | 0.50 | — |

TABLE 2-continued

|  | Comparative Examples | | | | | | | |
| --- | --- | --- | --- | --- | --- | --- | --- | --- |
|  | 1 | 2 | 3 | 4 | 5 | 6 | 7 | 8 |
| $Sb_2O_3$ | 2.5 | 2.0 | 2.0 | 3.0 | 2.0 | 3.0 | 2.0 | 3.0 |
| Antioxidant | 0.2 | 0.2 | 0.2 | 0.2 | 0.2 | 0.2 | 0.2 | 0.2 |
| Test item |  |  |  |  |  |  |  |  |
| UL-94, V-2 | Not pass | Pass | Pass | Not pass | Pass | Pass | Pass | Pass |
| Dripping | Yes | Yes | Yes | Yes | Yes | Yes | Yes | Yes |
| MFR, g/10 min. | 5.3 | 5.5 | 4.2 | 5.0 | 5.9 | 4.5 | 4.5 | 6.2 |
| HDT, °C. | 80 | 78 | 81 | 81 | 77 | 79 | 80 | 75 |
| Izod impact, J/m | 65 | 62 | 60 | 62 | 64 | 62 | 60 | 58 |
| Ball impact, mm | 500 | 400 | 300 | 400 | 800 | 500 | 300 | 250 |
| Thermal stability, Δ E | <3 | <3 | <3 | <3 | ≧3 | <3 | <3 | <3 |

Remarks: Comparative Example 6 additionally contains 0.01 parts by weight of organopolysiloxan TSF451-100 available from Toshiba Silicone Co., Ltd.

TABLE 3

|  | Example | | Comp. Example | |
| --- | --- | --- | --- | --- |
|  | 7 | 8 | 9 | 10 |
| Material |  |  |  |  |
| (parts by weight) |  |  |  |  |
| A#1: HI-PS | 70.0 | 70.0 | 70.0 | 70.0 |
| A#2: HI-PS | 30.0 | 30.0 | 30.0 | 30.0 |
| B#1 | 1.5 | 1.5 | — | — |
| C#1 | 1.0 | 0.5 | 6.0 | 4.0 |
| D#1 | 3.0 | 2.0 | — | — |
| Total flame retardant | 5.5 | 4.0 | 6.0 | 4.0 |
| D/(B + C + D) | 0.55 | 0.50 | — | — |
| C/(B + C) | 0.40 | 0.30 | 1.00 | 1.00 |
| $Sb_2O_3$ | — | 0.5 | — | 0.5 |
| Antioxidant | 0.2 | 0.2 | 0.2 | 0.2 |
| Test item |  |  |  |  |
| UL-94, V-2 | Pass | Pass | Not pass | Pass |
| Dripping | Yes | Yes | Yes | Yes |
| MFR, g/10 min. | 10.5 | 10.8 | 11.2 | 11.0 |
| HDT, °C. | 74 | 76 | 70 | 71 |
| Izod impact, J/m | 62 | 63 | 60 | 62 |
| Ball impact, mm | 850 | 850 | 750 | 850 |
| Thermal stability | <3 | <3 | ≧3 | ≧3 |

It will be appreciated from the results shown in Tables 1–3 that all compositions of Examples are superior in impact strength to the compositions of Comparative Examples in which either component (B) or (C) is used alone and also in thermal stability to the composition of Comparative Example 5 in which component (D) is used alone. The composition of Comparative Example 6 in which component (C) is combined with component (D) exhibits the desired flame retardancy but is inferior to the compositions of Examples in MFR and impact strength. Comparative Example 7 demonstrates that when components (B) and (C) are used in combination in an amount sufficient to achieve the desired flame retardancy, the impact strength of the resulting composition decreases compared with the composition of Examples. Comparative Example 8 in which reference flame retardant compound is used instead of components (B) and (C) is inferior to Examples in HDT and impact strength. Examples 7–8 and Comparative Examples 9–10 demonstrate that the addition of antimony trioxide enables the total amount of flame retardants to be decreased to achieve the desired level of flame retardancy while the thermal stability is not improved unless component (C) is used in combination with components (B) and (D).

What is claimed is:

1. A flame-retarded plastic composition comprising:
   (A) styrene-based plastic material;
   (B) a brominated aromatic compound having a melting point from 200° C. to 260° C. in which all bromine atoms are attached to the aromatic ring;
   (C) a brominated aromatic compound having a melting point above 300° C. in which all bromine atoms are attached to the aromatic ring;
   (D) an organic compound having at least one 2,3-dibromopropyl group; and optionally
   (E) antimony trioxide;
   the proportions of components (B), (C), (D) and (E) per 100 parts by weight of the styrene-based plastic material (A) are such that the sum of (B)+(C)+(D) is 3 to 10 parts by weight in which (D) occupies 20 to 80% by weight of the sum and (C) occupies 10 to 60% by weight of the balance, and (E) is 0 to 3 parts by weight.

2. The composition according to claim 1 wherein said component (B) is selected from the group consisting of tris(tribromophenoxy)triazine, a mixture thereof with dibromophenoxy-bis(tribromophenoxy)triazine and/or bis(dibromophenoxy)tribromophenoxytriazine.

3. The composition according to claim 1 wherein said component (C) is selected from the group consisting of brominated diphenylalkanes, ethylene-bis-brominated phthalimides brominated diphenyl ether and brominated phenyl benzyl ethers.

4. The composition according to claim 1 wherein said component (C) is selected from the group consisting of
   decabromodiphenylmethane,
   nonabromodiphenylmethane,
   decabromodiphenylethane,
   nonabromodiphenylethane,
   ethylene-bis-tetrabromophthalimide,
   decabromodiphenyl ether,
   nonabromodiphenyl ether, and
   pentabromophenyl pentabromobenzyl ether.

5. The composition according to claim 1 wherein said component (D) is 2,3-dibromopropyl ether of a chlorinated or brominated phenol, or tris(2,3dibromopropyl) isocyanurate.

6. The composition according to claim 1 wherein said component (D) is selected from the group consisting of
   1-(2,3-dibromopropoxy)-2,4,6-tribromobenzene;
   1-(2,3-dibromopropoxy)-2,4-dibromobenzene;
   4,4'-bis(2,3-dibromopropoxy)-3,3',5,5'-tetrabromobiphenyl;

bis[4-(2,3-dibromopropoxy)-3,5-dibromophenyl] methane;

1,1-bis[4-(2,3-dibromopropoxy)-3,5-dibromophenyl] ethane;

2,2-bis[4-(2,3-dibromopropoxy)-3,5-dibromophenyl] propane;

bis[4-(2,3-dibromopropoxy)-3,5-dichlorophenyl] methane;

1,1-bis[4-(2,3-dibromopropoxy)-3,5-dichlorophenyl] ethane;

2,2-bis[4-(2,3-dibromopropoxy)-3,5-dichlorophenyl] propane;

bis[4-(2,3-dibromopropoxy)-3,5-dibromophenyl]sulfide;

bis[4-(2,3-dibromopropyl)-3,5-dibromophenyl]sulfoxide;

bis[4-(2,3-dibromopropyl)-3,5-dibromophenyl]sulfone; and tris(2,3-dibromopropyl)isocyanurate.

7. A flame-retarded plastic article fabricated from the composition of claim 1.

8. The composition according to claim 2 wherein said component (C) is selected from the group consisting of brominated diphenylalkanes, ethylene-bis-brominated phthalimides brominated diphenyl ether and brominated phenyl benzyl ethers.

9. The composition according to claim 2 wherein said component (C) is selected from the group consisting of
decabromodiphenylmethane,
nonabromodiphenylmethane,
decabromodiphenylethane,
nonabromodiphenylethane,
ethylene-bis-tetrabromophthalimide,
decabromodiphenyl ether,
nonabromodiphenyl ether, and
pentabromophenyl pentabromobenzyl ether.

10. The composition according to claim 2 wherein said components (D) is 2,3-dibromopropyl ether of a chlorinated or brominated phenol, or tris(2,3-dibromopropyl) isocyanurate.

11. The composition according to claim 2 wherein said component (D) is selected from the group consisting of
1-(2,3-dibromopropoxy)-2,4,6-tribromobenzene;
1-(2,3-dibromopropoxy)-2,4-dibromobenzene;
4,4'-bis(2,3-dibromopropoxy)-3,3',5,5'-tetrabromobiphenyl;
bis[4-(2,3-dibromopropoxy)-3,5-dibromophenyl] methane;
1,1-bis[4-(2,3-dibromopropoxy)-3,5-dibromophenyl] ethane;
2,2-bis[4-(2,3-dibromopropoxy)-3,5-dibromophenyl] propane;
bis[4-(2,3-dibromopropoxy)-3,5-dichlorophenyl] methane;
1,1-bis[4-(2,3-dibromopropoxy)-3,5-dichlorophenyl] ethane;
2,2-bis[4-(2,3-dibromopropoxy)-3,5-dichlorophenyl] propane;
bis[4-(2,3-dibromopropoxy)-3,5-dibromophenyl] sulfide;
bis[4-(2,3-dibromopropyl)-3,5-dibromophenyl] sulfoxide;
bis[4-(2,3-dibromopropyl)-3,5-dibromophenyl] sulfone; and
tris(2,3-dibromopropyl)isocyanurate.

12. The composition according to claim 3 wherein said component (D) is 2,3-dibromopropyl ether of a chlorinated or brominated phenol, or tris(2,3-dibromopropyl) isocyanurate.

13. The composition according to claim 3 wherein said component (D) is selected from the group consisting of
1-(2,3-dibromopropoxy)-2,4,6-tribromobenzene;
1-(2,3-dibromopropoxy)-2,4-dibromobenzene;
4,4'-bis(2,3-dibromopropoxy)-3,3',5,5'-tetrabromobiphenyl;
bis[4-(2,3-dibromopropoxy)-3,5-dibromophenyl] methane;
1,1-bis[4-(2,3-dibromopropoxy)-3,5-dibromophenyl] ethane;
2,2-bis[4-(2,3-dibromopropoxy)-3,5-dibromophenyl] propane;
bis[4-(2,3-dibromopropoxy)-3,5-dichlorophenyl] methane;
1,1-bis[4-(2,3-dibromopropoxy)-3,5-dichlorophenyl] ethane;
2,2-bis[4-(2,3-dibromopropoxy)-3,5-dichlorophenyl] propane;
bis[4-(2,3-dibromopropoxy)-3,5-dibromophenyl] sulfide;
bis[4-(2,3-dibromopropyl)-3,5-dibromophenyl] sulfoxide;
bis[4-(2,3-dibromopropyl)-3,5-dibromophenyl] sulfone; and
tris(2,3-dibromopropyl)isocyanurate.

14. The composition according to claim 4 wherein said component (D) is 2,3-dibromopropyl ether of a chlorinated or brominated phenol, or tris(2,3-dibromopropyl) isocyanurate.

15. The composition according to claim 4 wherein said component (D) is selected from the group consisting of
1-(2,3-dibromopropoxy)-2,4,6-tribromobenzene;
1-(2,3-dibromopropoxy)-2,4-dibromobenzene;
4,4'-bis(2,3-dibromopropoxy)-3,3',5,5'-tetrabromobiphenyl;
bis[4-(2,3-dibromopropoxy)-3,5-dibromophenyl] methane;
1,1-bis[4-(2,3-dibromopropoxy)-3,5-dibromophenyl] ethane;
2,2-bis[4-(2,3-dibromopropoxy)-3,5-dibromophenyl] propane;
bis[4-(2,3-dibromopropoxy)-3,5-dichlorophenyl] methane;
1,1-bis[4-(2,3-dibromopropoxy)-3,5-dichlorophenyl] ethane;
2,2-bis[4-(2,3-dibromopropoxy)-3,5-dichlorophenyl] propane;
bis[4-(2,3-dibromopropoxy)-3,5-dibromophenyl] sulfide;
bis[4-(2,3-dibromopropyl)-3,5-dibromophenyl] sulfoxide;
bis[4-(2,3-dibromopropyl)-3,5-dibromophenyl] sulfone; and
tris(2,3-dibromopropyl)isocyanurate.

16. A flame-retarded plastic article fabricated from the composition of claim 2.

17. A flame-retarded plastic article fabricated from the composition of claim 3.

18. A flame-retarded plastic article fabricated from the composition of claim 4.

19. A flame-retarded plastic article fabricated from the composition of claim 5.

20. A flame-retarded plastic article fabricated from the composition of claim 6.

* * * * *